(12) United States Patent
Beutel et al.

(10) Patent No.: US 12,515,250 B2
(45) Date of Patent: Jan. 6, 2026

(54) TOOL UNIT FOR A COLD FORMING MACHINE

(71) Applicant: OSG EX-CELL-O GmbH, Goeppingen (DE)

(72) Inventors: Florian Beutel, Geislingen (DE); Rafael Schweda, Ottenbach (DE)

(73) Assignee: OSG EX-CELL-O GMBH, Goeppingen (DE)

(*) Notice: Subject to any disclaimer, the term of this patent is extended or adjusted under 35 U.S.C. 154(b) by 215 days.

(21) Appl. No.: 18/142,441

(22) Filed: May 2, 2023

(65) Prior Publication Data

US 2023/0356285 A1 Nov. 9, 2023

(30) Foreign Application Priority Data

May 3, 2022 (DE) .................... 10 2022 110 872.4

(51) Int. Cl.
*B21H 3/06* (2006.01)
*B21H 5/02* (2006.01)

(52) U.S. Cl.
CPC .................. *B21H 5/027* (2013.01)

(58) Field of Classification Search
CPC ............ B21H 3/02; B21H 3/06; B21H 5/027; B21H 1/18; B21H 5/02
USPC ....................................... 72/88, 90
See application file for complete search history.

(56) References Cited

U.S. PATENT DOCUMENTS

| | | | | | |
|---|---|---|---|---|---|
| 1,266,402 | A | * | 5/1918 | Canda | B21H 5/027 72/88 |
| 2,225,607 | A | * | 12/1940 | Boggild | B21H 3/06 72/90 |
| 4,016,738 | A | * | 4/1977 | Puchko | B21H 1/18 72/469 |

(Continued)

FOREIGN PATENT DOCUMENTS

| DE | 10212256 A1 | 5/2003 |
|---|---|---|
| EP | 0181132 A2 | 5/1986 |

(Continued)

OTHER PUBLICATIONS

DE 10212256A1, Decker et al. May 2003.*

(Continued)

*Primary Examiner* — Edward T Tolan
(74) *Attorney, Agent, or Firm* — CANTOR COLBURN LLP

(57) ABSTRACT

A tool unit for a cold forming machine. The tool unit has a tool slide, which is linearly movable in a longitudinal direction. A carrier for a cold forming rack of the tool unit is provided on the tool slide. By means of an adjustment device, the carrier can be positioned in a working direction. For this purpose carrier can be preferably linearly moved in working direction. In working direction the cold forming rack is supported on the carrier and is clamped by means of a clamping device against the carrier. For this purpose the clamping device has at least one clamping body, which can be moved opposed to a clamping force (F) in working direction and abuts against the cold forming rack. The clamping device is preferably not directly connected with the carrier. The clamping force is particularly supported indirectly or directly on the tool slide by passing carrier.

13 Claims, 4 Drawing Sheets

(56) References Cited

U.S. PATENT DOCUMENTS

| | | | |
|---|---|---|---|
| 4,729,232 A * | 3/1988 | Hillier | B21H 3/06 |
| | | | 72/481.4 |
| 5,987,953 A * | 11/1999 | Killop | B21H 5/027 |
| | | | 72/88 |
| 6,301,945 B1 | 10/2001 | Roseliep | |
| 7,353,679 B2 | 4/2008 | Kreissig et al. | |
| 8,984,622 B1 * | 3/2015 | Baldwin | G06V 40/162 |
| | | | 726/16 |
| 11,407,023 B2 | 8/2022 | Beutel et al. | |

FOREIGN PATENT DOCUMENTS

| | | | |
|---|---|---|---|
| EP | 1286794 B1 | 9/2004 | |
| EP | 3807023 B1 | 3/2022 | |
| GB | 2242637 A * | 10/1991 | B21H 3/06 |
| JP | S5568143 A | 5/1980 | |
| JP | S59175447 U | 11/1984 | |
| KR | 101921245 B1 | 11/2018 | |

OTHER PUBLICATIONS

JP 58-205636A, Yagi Nov. 1983.*
CN 112170751A, Hu et al. Jan. 2021.*
SU 956115A1, Sukhodrev et al. Sep. 1982.*
CN 112338115A, Zhang et al. Feb. 2021.*
JP 59-6132A, Iwami et al. Nov. 1984.*
JP 60-166136A, Hasegawa Aug. 1985.*
Extended EP Search Report dated Sep. 19, 2023; EP Application No. 23171163.1; 4 pages (non-English).
Office Action dated Jan. 16, 2023; German Application No. 10 2022 110 872.4; 7 pages (non-English).

* cited by examiner

TOOL UNIT FOR A COLD FORMING MACHINE

CROSS REFERENCE TO RELATED APPLICATIONS

This application claims priority under 35 U.S.C. § 119 to the following German Patent Application No. 10 2022 110 872.4, filed on May 3, 2022, the entire contents of which are incorporated herein by reference thereto.

BACKGROUND

The present disclosure refers to a tool unit for a cold forming machine. The cold forming machine is configured for cold forming a cylindrical workpiece in order to produce a profile on the outer side thereof, e.g. a toothing or thread. The toothing can thereby be orientated parallel (spur toothing) or inclined (helical toothing) relative to the axis of the cylindrical workpiece. The profile can be at least produced along a section in axial direction of the workpiece.

The cold forming machine includes two tool units, each having one or more cold forming racks. Each cold forming rack has a cold forming profile that corresponds to the profile to be produced on the workpiece. The two cold forming racks of the tool units are pressed against the workpiece from opposite sides in a working direction and are moved opposite to one another orthogonal to the working direction in a longitudinal direction in which the cold forming racks extend. In doing so, the workpiece is rolled between the two cold forming racks around its axis and formed. The profile produced thereby can completely extend in circumferential direction around the workpiece.

Cold forming machines and methods for producing such a profile are known, e.g. from EP 1 286 794 B1 or EP 3 807 023 B1.

In order to be able to process workpieces having different diameters, cold forming machines exist in which tool slides of the tool units, on which the cold forming racks are installed, can be moved and positioned in working direction by means of a machine axis toward or away from one another. However, also cold forming machines of simpler configuration exist in which such a machine axis is missing and the tool slides have a predefined distance in working direction. In such cold forming machines the position of the cold forming racks in working direction has to be modified by an at least partly manual method. Usually the cold forming rack is attached directly or indirectly on the tool slide by means of a screw connection in order to support the forming forces and to avoid an undesired displacement of the cold forming racks. This clamping has to be released manually. Subsequently, the position of the cold forming rack in working direction can be modified by means of an adjustment device and adjusted as desired. Then the mechanical attachment of the cold forming rack, usually a screw connection, can be re-established and the position of the cold forming rack in the tool unit is fixed thereby.

BRIEF SUMMARY

Starting from the prior art it is an object of the present disclosure to provide a tool unit for a cold forming machine in which the forces acting on the cold forming rack during production of a profile in a workpiece are well supported and concurrently a simple adjustment of a profile distance between cold forming racks of two tool units is allowed.

A tool unit for a cold forming machine, including: a tool slide that is linearly movably arranged in a longitudinal direction, a carrier, which is arranged on the tool slide and which is configured to arrange a cold forming rack in a manner so that a cold forming profile of the cold forming rack is orientated in a working direction, an adjustment device, which is arranged on the tool slide, wherein the adjustment device comprises an adjustment motor and is configured to move the carrier in working direction by means of the adjustment motor relative to the tool slide, and a clamping device, which is arranged on the tool slide, which comprises a clamping body that is movably supported opposed to a clamping force in working direction, whereby the clamping device is configured to urge the cold forming rack in working direction against the carrier by means of the at least one clamping body.

The tool unit according to the present disclosure is configured and provided for use in a cold forming machine. A cold forming machine can comprise at least one and preferably two tool units according to the present disclosure. Also more than two tool units according to the present disclosure can be used in a cold forming machine. In doing so, for example, it is possible to use more than one cold forming rack for each slide in the cold forming machine.

The tool unit has a tool slide that is linearly movably arranged in a longitudinal direction. A carrier is arranged on the tool slide. The carrier is configured to carry the cold forming rack and to support forces acting on the cold forming rack in a working direction that particularly occur during deformation. For this purpose, the carrier can comprise a contact surface orientated in working direction on which the cold forming rack can be arranged. In operating position, if the cold forming rack is arranged on the carrier, the cold forming profile faces in working direction. In the cold forming machine two cold forming racks are arranged with a profile distance relative to one another in working direction, the cold forming profiles of which are facing one another and the workpiece. A workpiece can be formed between the two cold forming racks for producing a profile on the outer circumference.

The tool unit according to the present disclosure includes in addition an adjustment device that is arranged on the tool slide. The adjustment device has an adjustment motor. The adjustment motor is preferably an electric motor. The adjustment motor can be operatingly connected with the carrier by means of a gear, preferably a wedge gear. The adjustment device is configured to move the carrier relative to the tool slide in working direction and to bring it in a desired position. In this manner the profile distance between the two cold forming racks of different tool units can be modified and adjusted in a cold forming machine.

In addition, the tool unit according to the present disclosure has a clamping device that is—preferably directly—arranged on the tool slide. The clamping device includes at least one clamping body that creates a clamping force on the cold forming rack in working direction. The cold forming rack is urged against the carrier by means of the clamping force and held thereby. The clamping body is movably supported opposed to the clamping force in working direction. The clamping body can produce the clamping force as tensile force or thrust force.

The adjustment device is configured to move the carrier and the cold forming rack together opposed to the clamping force in working direction in order to adjust the desired position of the cold forming rack in working direction.

The clamping device provides for the reliable holding of the cold forming rack. Due to the movable support of the clamping body, it is however possible to move the carrier by means of the adjustment device opposed to the clamping force in a motor-driven manner and to allow an automatic positioning of the cold forming rack.

In an embodiment the tool slide of the tool unit cannot be moved or positioned automatically in by means of a machine axis or another device. It can be immovably arranged in working direction.

The tool slide of the tool unit is linearly movably arranged in longitudinal direction. The cold forming rack extends in longitudinal direction and is moved by means of the tool slide in longitudinal direction during deformation of the workpiece. The clamping device is preferably configured to support the cold forming rack in longitudinal direction on the tool slide in order to avoid an undesired relative movement between the cold forming rack and the tool slide in longitudinal direction.

It is preferred, if the clamping device includes two clamping units arranged with distance to one another in longitudinal direction. The cold forming rack can be arranged in the interstice between the two clamping units.

It is advantageous, if at least one of the clamping units includes a stationary stop surface for the cold forming rack. The stationary stop surface is immovably arranged in longitudinal direction relative to the tool slide. The stationary stop surface is particularly not arranged on the at least one clamping body, but on another component of the at least one clamping unit, e.g. on a base body. A force acting on the cold forming rack in longitudinal direction can be introduced into the clamping unit via the stationary stop surface and can be introduced via the clamping unit into the tool slide and supported in this manner. The carrier is preferably arranged outside the force flow supporting the cold forming rack in longitudinal direction. Thus, a force acting in longitudinal direction is not or only to a minor proportion supported by the carrier. This simplifies the realization of the adjustment device, because the carrier is movable in longitudinal direction by means of the adjustment device. Therefore, the adjustment device does not have to support large forces in longitudinal direction that occur during deformation of the workpiece.

It is in addition advantageous, if at least one of the clamping units and particularly the clamping unit that does not comprise a stationary stop surface, includes a positionable stop surface for the cold forming rack, the positionable stop surface being positionable in longitudinal direction relative to the tool slide. Preferably the positionable stop surface is arranged on the clamping body. Alternatively, the positionable stop surface can also be arranged on another component of the clamping unit, e.g. on a separate stop body that is arranged in a positionable manner on a base body of the clamping unit. By using the clamping body as positionable stop surface, a particularly compact and simple configuration can be achieved.

It is advantageous, if each clamping unit includes a base body that is arranged on the tool slide. The base body can be immovably attached on the tool slide by means of a screw connection or another mechanical connection with the tool unit being ready for operation in the cold forming machine. Thereby, for example, the position of a stationary stop surface present on the base body is defined relative to the tool slide. Although it can be possible to attach the base body in different positions on the tool slide. However, the position of the base body relative to the tool slide cannot be changed in a motor-driven manner or in another way in an automated manner. After setting up the tool unit for operation the relative position between the base body and the tool slide is preferably unchangeable.

In an embodiment the adjustment motor of the adjustment device can be arranged on the base body of one of the two clamping units.

It is preferred, if each clamping unit of the clamping device includes at least one clamping body and particularly exactly one clamping body.

At least the clamping body, which includes the positionable stop surface, can be supported in a positionable manner on the base body of the respective clamping unit. It is sufficient, if the at least one clamping body of one of the two clamping units can be positioned in longitudinal direction. However, also all clamping bodies of the clamping units can be supported in positionable manner in longitudinal direction on the base body of the respective clamping unit.

The at least one clamping body of the clamping device can be pivotably supported around a pivot axis. The pivot axis extends preferably inclined or orthogonal to the working direction. In a preferred embodiment the pivot axis extends in a transverse direction, wherein the transverse direction is orientated orthogonal to the working direction and orthogonal to the longitudinal direction.

For pivotable support the clamping body can be arranged in a torque-proof manner on a shaft. The shaft extends along the pivot axis, e.g. in transverse direction. The shaft is rotatably supported on the base body of the respective clamping unit. If the clamping body is arranged in a manner to be positionable in longitudinal direction on the base body, the shaft can be supported in a manner to be movable or positionable in longitudinal direction relative to the base body. For example, the shaft can be supported within a longitudinal recess on the base body. Inside the longitudinal recess the shaft can be positioned in longitudinal direction. For example, the position can be adjusted by means of at least one threaded bolt.

In a preferred embodiment the at least one clamping body is realized by a two-arm lever. In this embodiment the clamping body includes two arms extending in different directions away from the pivot axis. The two arms can extend away from one another in diametrically opposed directions. The arms have preferably different lengths from the pivot axis up to the free end of the respective arm. In an embodiment the two-arm lever can be a straight lever that is pivotably supported around the pivot axis offset from the center.

The one, first arm of the lever can be configured to abut against the cold forming rack. The other, second arm of the lever can be configured to create a clamping force by means of at least one clamping element. For this purpose the second arm can be supported via the at least one clamping element via the clamping unit on the tool slide. Preferably the at least one clamping element can be supported on a base body of the clamping unit.

In a preferred embodiment the second arm is longer than the first arm, particularly at least about the factor of 2 or 3.

In an embodiment the carrier can be drivingly connected with the adjustment motor via a wedge gear. For this purpose the carrier can comprise a base surface inclined in longitudinal direction. The base surface can be supported on a support surface of a support body inclined in longitudinal direction. The adjustment device is configured to move the carrier and support body relative to one another in longitudinal direction. Due to the inclined slope, also the position of the carrier in working direction relative to the tool slide changes thereby.

The base surface and/or the support surface can be a continuous surface extending in a common plane or can be realized by surface sections, which are arranged in a common plane, but are not connected with one another in this plane.

For example, the adjustment device can comprise a spindle arrangement via which the adjustment motor is coupled to the carrier. For example, the spindle can be drivingly coupled with a motor shaft of the adjustment motor and can be in engagement with a spindle nut that is arranged on the carrier in a torque-proof manner. It is also possible to connect the spindle nut with the motor shaft and to arrange the spindle in a torque-proof manner on the carrier.

In an embodiment a coupling element can be provided between the motor shaft of the adjustment motor and the spindle, the coupling element allowing an articulation angle between the axis of the motor shaft and the axis of the spindle. For example, the coupling element can be a cardan joint.

In order to avoid or limit the articulation angle between the motor shaft of the adjustment motor and the spindle, the base body can preferably comprise an attachment surface that is not orthogonally orientated relative to the longitudinal direction on which the adjustment motor is attached so that the motor shaft extends substantially parallel to the spindle.

Advantageous embodiments of the tool unit are derived from the dependent claims, the description and the drawings.

BRIEF DESCRIPTION OF THE DRAWINGS

In the following, preferred embodiments of the present disclosure are explained in detail based on the attached drawings. The drawings show.

DETAILED DESCRIPTION

Figure 1:
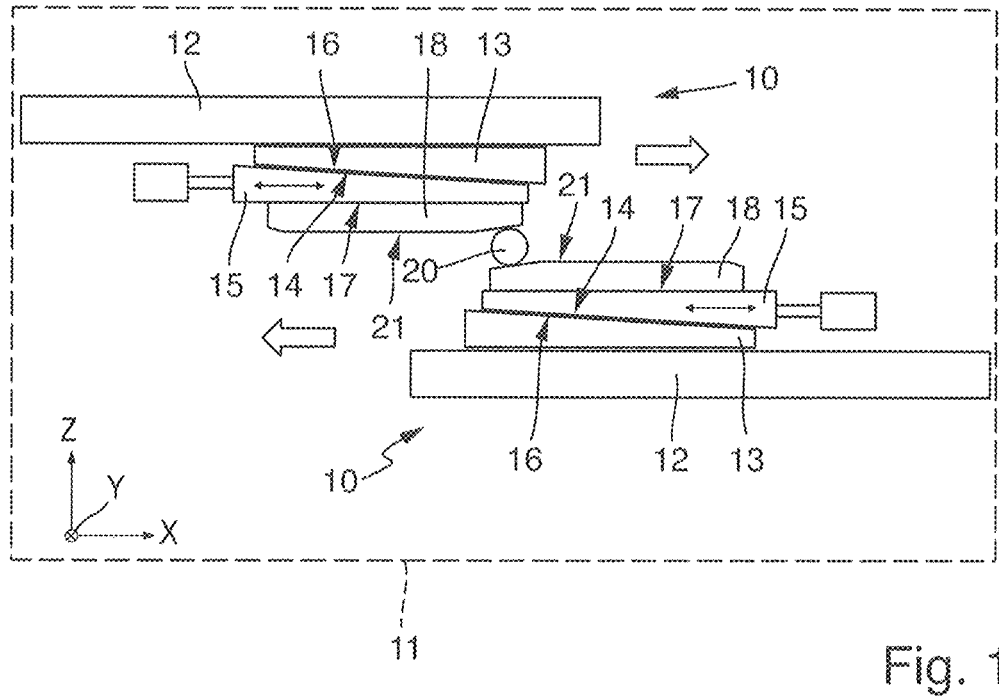
FIG. 1 a block diagram of two tool units according to the present disclosure of a cold forming machine, FIG. 2 a side view of an embodiment of a tool unit having a clamping device for holding a cold forming rack on a tool slide, FIG. 3 a side view of a first clamping unit of the clamping device of FIG. 2, FIG. 4 a side view of a partial illustration of two clamping units of the clamping device of FIG. 2, FIG. 5 a modified embodiment of the first clamping unit of the clamping device of FIG. 2 in a partial illustration in side view, FIG. 6 a schematic illustration of an embodiment of the tool unit in a cross-section and FIG. 7 a side view of an embodiment of the tool unit.

In FIG. 1 two tool units 10 of a cold forming machine 11 are illustrated highly schematically in the type of a block diagram. The two tool units 10 are identically configured according to the example, so that it is sufficient to describe one of the two tool units 10. In an alternative embodiment of the cold forming machine 11 it can be sufficient to provide only one tool unit 10 configured according to the present disclosure, wherein the respective other tool unit can be optionally configured also in an arbitrary embodiment according to the prior art.

The tool unit 10 according to the present disclosure includes a tool slide 12, which is linearly movable in a longitudinal direction X. The tool slide 12 can be moved in longitudinal direction X by means of a not illustrated machine axis of the cold forming machine 11.

Figure 2:
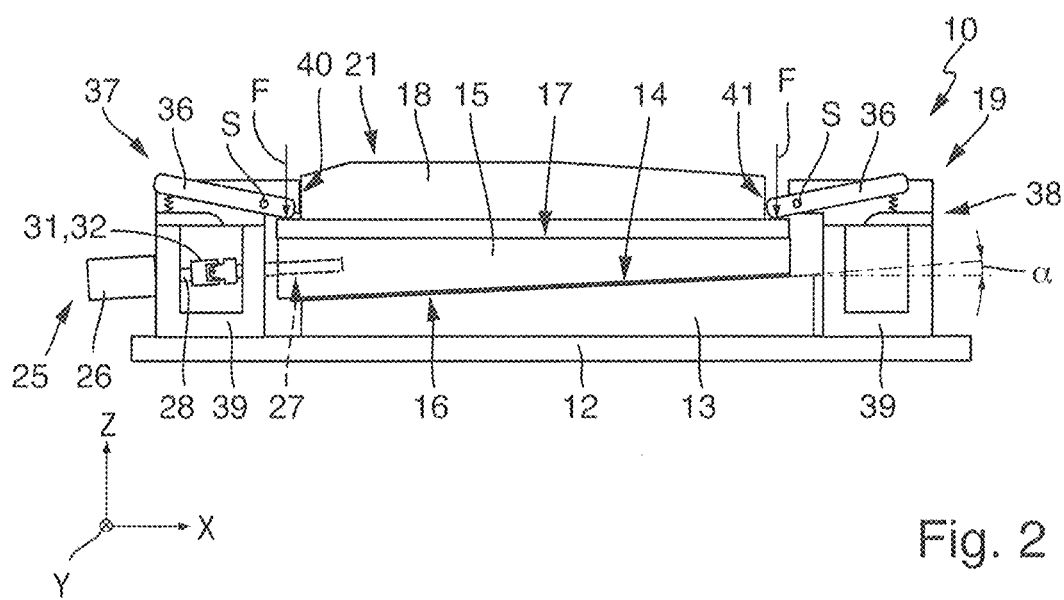
Figure 7:
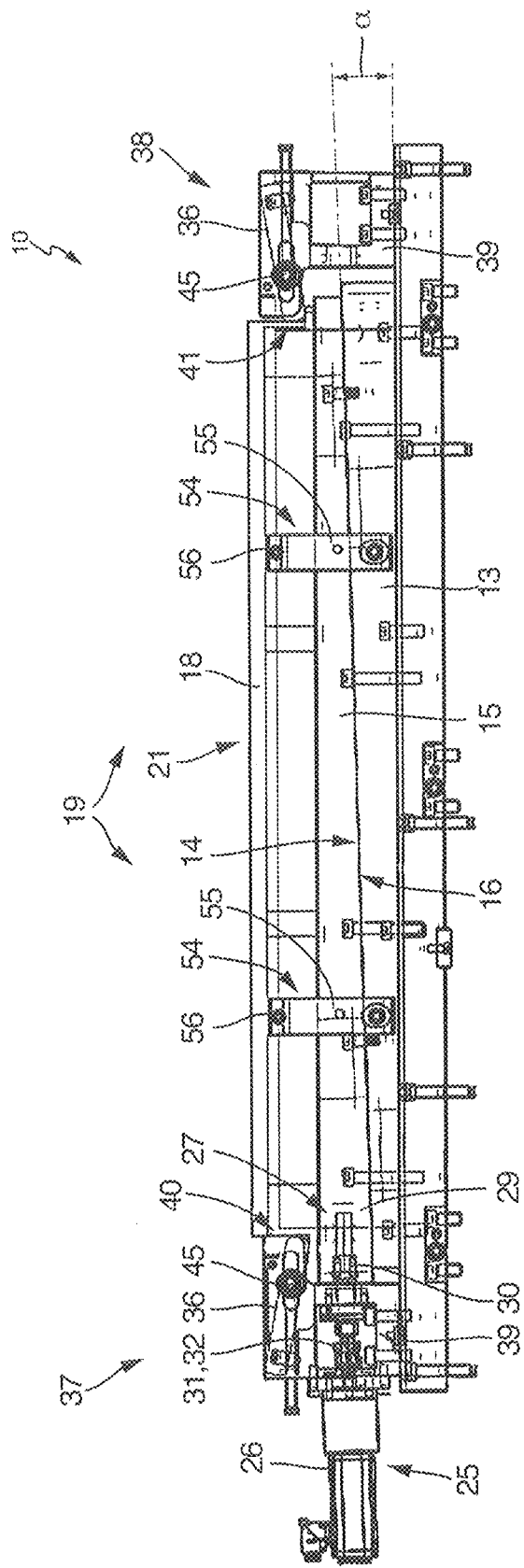

A support body 13 is mounted on the tool slide 12. The support body 13 has a support surface 14 on which a carrier 15 is supported by means of a base surface 16. The support surface 14 as well as the base surface 16 extend parallel to a transverse direction Y orientated orthogonal to the longitudinal direction X. The longitudinal direction X, the transverse direction Y and a working direction Z form a Cartesian coordinate system in the embodiment that is stationary relative to a machine frame or a machine basis of the cold forming machine 11. The support surface 14 as well as the base surface 16 are obliquely inclined relative to the longitudinal direction X. In the embodiment the support surface 14 and the base surface 16 abut against one another in a plane that includes an inclination angle α with the longitudinal direction X. The inclination angle α is less than 15°, preferably less than 10° and in the embodiment less than 5° (FIGS. 2 and 7).

The carrier 15 is movably arranged in longitudinal direction X on the tool slide relative to the support body 13. Preferably the support is realized by means of a friction bearing between the carrier 15 and the support body 13. The support surface 14 and the base surface 16 abut against one another in the common plane in a two-dimensional manner in the embodiment.

On its side facing away from the base surface 16 the carrier 15 comprises a contact surface 17. A cold forming rack 18 of the tool unit 10 can be brought into abutment on the contact surface 17. By means of a clamping device 19 the cold forming rack 18 is held on the tool slide 12 and particularly secured against undesired relative movements relative to the tool slide 12. In the embodiment the clamping device 19 is configured to allow an adjustment or setting movement of the carrier 15 and thus also the cold forming rack 18 arranged thereon in working direction Z relative to the tool slide 12 and to block a relative movement in longitudinal direction X.

The cold forming rack 18 is a tool for forming a workpiece 20 (FIG. 1). By means of the cold forming machine 11, a profile, e.g. a spur toothing, a helical toothing or a thread can be produced in an axial section of a cylindrical workpiece 20. The produced profile is defined by a cold forming profile 21 of the cold forming rack 18. The cold forming profile 21 is not illustrated in detail in the drawing and formed by teeth arranged with distance to one another in longitudinal direction, wherein a tooth gap is present between two directly adjacent teeth respectively. The cold forming profile 21 is present on the side of the cold forming rack 18 facing the workpiece 20 and thus on the side of the cold forming rack 18 facing away from carrier 15.

During forming the cold forming profiles 21 of the cold forming racks 18 of the two tool units 10 of the cold forming machine 11 are brought into engagement with the workpiece 20. The tool slides 12 of the two tool units 10 are moved opposite one another or by opposing motion in longitudinal direction X, as schematically illustrated by means of the block arrows in FIG. 1. Due to the engagement with the cold forming profiles 21, the workpiece 20 rolls on the two cold forming racks 18 while a profile is produced at its outer circumference by means of cold forming.

In order to be able to adjust the distance between the two cold forming racks 18 or the two cold forming profiles 21 in the cold forming machine 11, the tool unit 10 includes an adjustment device 25. The adjustment device 25 has an adjustment motor 26 that is drivingly connected with carrier 15. The adjustment motor 26 is preferably an electric motor.

The adjustment device 25 is configured to adjust the position of carrier 15 in working direction Z relative to the tool slide 12. For this carrier 15 can be moved by means of adjustment motor 26 so that the position of its contact surface 17 and thus the position of the cold forming rack 18 arranged on the contact surface 17 changes in working direction Z. In the embodiment adjustment motor 26 is configured to slidingly move carrier 15 in longitudinal direction X relative to the support body 13. Due to the inclination angle α of base surface 16 of the carrier 15 and support surface 14 of the support body 13, also a movement of the carrier 15 in working direction Z relative to the tool slide 12 occurs during this relative movement in longitudinal direction X. In doing so, the position in working direction Z of cold forming rack 18 relative to the tool slide 12 of the tool unit 10 can be modified and adjusted.

The driving connection between the adjustment motors 26 and the carrier 15 is preferably self-locking and in the embodiment realized by a spindle arrangement 27. Forces in working direction Z that are introduced via cold forming rack 18 into carrier 15 during deformation of the workpiece 20 do not have to be supported by the adjustment motor 26. Therefore, after adjustment of the position of the cold forming rack 18 in working direction Z the adjustment motor 26 does not need to apply a torque.

Figure 3:
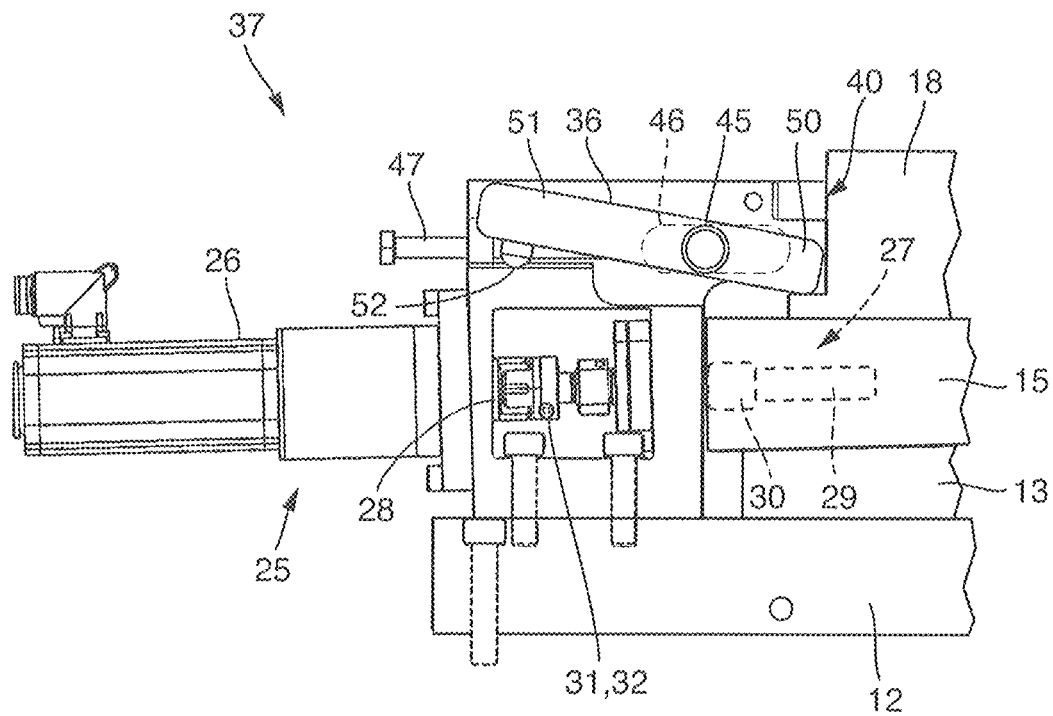
Figure 4:
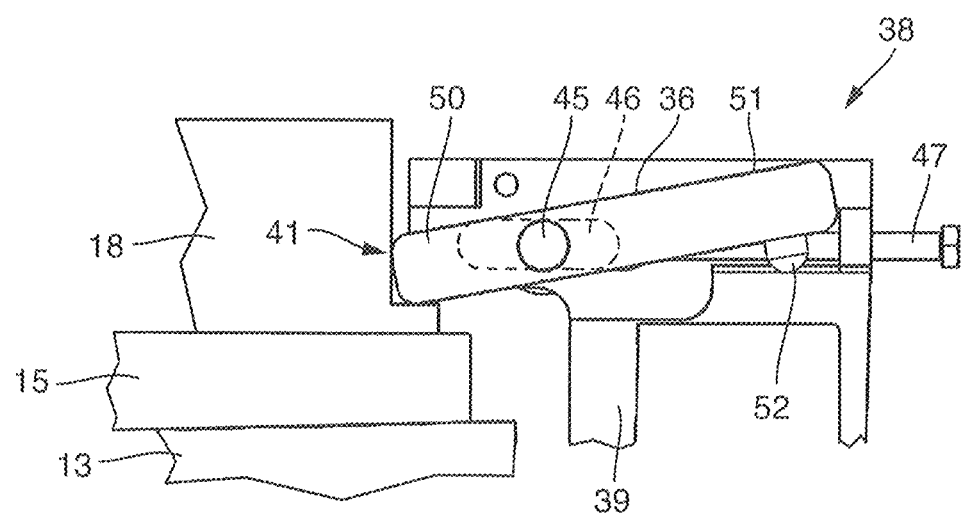

In the embodiment the spindle arrangement 27 has a spindle 29, which is drivingly coupled with a motor shaft 28 of adjustment motor 26. The spindle 29 is in threaded engagement with a spindle nut 30, which is arranged on the carrier 15 in a torque-proof manner in the embodiment, e.g. in a cavity of the carrier 15, into which spindle 29 can extend. If spindle 29 is driven, nut 30 moves along the spindle 29, whereby a movement of carrier 15 in longitudinal direction X can be caused. Because carrier 15 thereby also moves in working direction Z relative to the tool slide 12, a coupling element 31 is arranged in the driving connection between spindle 29 and motor shaft 28 by means of which a non-aligned orientation between motor shaft 28 and spindle 29 is allowed. In the embodiment coupling element 31 is formed by a coupling 32 (FIGS. 2, 3 and 7).

The surface of the base body 39, on which the electric motor is attached, is orientated in an angle obliquely to the longitudinal direction X, according to the example, so that substantially no articulation angle is created between motor shaft 28 and spindle 29.

Alternatively, the angle surface of the base body can be omitted in that a gimbal coupling 32 is used between spindle 29 and motor shaft 28.

In order to allow movement of cold forming rack 18 in working direction Z relative to tool slide 12, the clamping device 19 includes a clamping body 36 and according to the example two clamping bodies 36, which create a clamping force F between tool slide 12 and cold forming rack 18. Due to this clamping force F, cold forming rack 18 is urged against the contact surface 17 of carrier 15. The clamping force F can be a tensile force or a thrust force. In the embodiment the clamping bodies 36 create a thrust force that presses cold forming rack 18 against carrier 15.

Each clamping body 36 is movably supported in working direction Z opposed to the clamping force F. In doing so, a movement and positioning of carrier 15 and thus cold forming rack 18 in working direction Z can be carried out by means of the adjustment device 25.

In the embodiment clamping device 19 includes a first clamping unit 37 and a second clamping unit 38. The clamping units 37, 38 have a base body 39 in each case, which is immovably attached on the tool slide 12 with the tool unit 10 being ready for operation. The configuration of the base body 39 can vary. Preferably the base bodies 39 of the two clamping units 37, 38 are configured identically or similarly.

As illustrated in FIGS. 2, 3 and 7, the base body 39 of the first clamping unit 37 can be configured for arrangement of the adjustment device 25. For this purpose adjustment motor 26 can be arranged on base body 39 of the first clamping unit 37, for example. The coupling element 31 can be arranged in a recess or a central hollow space of base body 39. The motor shaft 28 and the spindle 29 can extend through recesses or through-holes in the base body 39.

The cold forming rack 18 is arranged between the two clamping units 37, 38 in longitudinal direction X. The clamping units 37, 38 are configured to support the cold forming rack 18 in longitudinal direction X relative to the tool slide 12 in order to avoid a relative movement in longitudinal direction X relative to the tool slide 12. Forces acting in longitudinal direction X on cold forming rack 18 are supported by means of clamping units 37, 38 on the tool slide 12. Such longitudinal forces are not or only to a minor extent introduced into carrier 15, so that only small forces are introduced from carrier 15 into adjustment device 25 during operation of the cold forming machine 11.

Preferably at least one of the two clamping units 37, 38 and in the embodiment the first clamping unit 37 includes a stationary stop surface 40 against which the cold forming rack 18 abuts with one axial end. The stationary stop surface 40 is provided on base body 39 of the first clamping unit 37. In a condition of the tool unit 10 ready for operation stationary stop surface 40 is immovably arranged relative to the tool slide 12 in longitudinal direction X.

On the respective other clamping unit and according to the example the second clamping unit 38, a positionable stop surface 41 that can be positioned in longitudinal direction X can be provided for the cold forming rack 18. In a position ready for use the axial end of the cold forming rack 18 assigned to the second clamping unit 38 abuts against the positionable stop surface 41.

Preferably the stationary stop surface 40 is assigned to the axial end of cold forming rack 18 that is arranged at the back in movement direction of the tool unit 10—at least during the first or single forming stroke of the tool unit 10. Thus, forces in longitudinal direction X that act on the cold forming rack 18 during forming the workpiece 20 are received by stationary stop surface 40, and according to the example base body 39, and introduced via base body 39 into the tool slide 12, preferably directly.

Cold forming racks 18 having different lengths can be arranged between the two clamping units 37, 38, due to the positionable stop surface 41.

In the embodiment each clamping unit 37, 38 includes at least one and, according to the example, exactly one clamping body 36. In the embodiment the clamping body 36 is pivotably supported around a pivot axis S that extends obliquely or orthogonal to the working direction Z. According to the example, the pivot axis S extends in transverse direction Y (FIG. 2).

For pivotable support clamping body 36 is connected to a shaft 45 in a torque-proof manner according to the example. The shaft 45 is in turn rotatably arranged on base body 39 of the respective clamping unit 37 or 38 (FIGS. 3-5 and 7). The shaft 45 extends along the pivot axis S. In the embodiment illustrated here the shaft 45 is arranged in a longitudinal recess 46, extending in longitudinal direction X, in a movable or positionable manner. The longitudinal recess 46 is configured in the type of an oblong hole or a longitudinal groove. The position of the shaft 45 within the longitudinal recess 46 can be adjusted and fixed, e.g. by means of a threaded bolt 47 that extends in longitudinal direction X and is immovably arranged in longitudinal direction X on the base body 39. The threaded bolt 47 is in engagement with the respective counter thread of shaft 45. By means of rotation of the threaded bolt 47, the shaft 45 moves in longitudinal direction X along the threaded bolt 47.

In this manner the position of the pivotably supported clamping body 36 can be adjusted in longitudinal direction X relative to the base body 39 and thus relative to the tool slide 12.

As particularly apparent from FIGS. 2-5, clamping body 36 of each clamping unit 37, 38 can be configured as two-arm lever in the embodiment, comprising a first arm 50 and a second arm 51. Each arm 50, 51 extends away originating from the pivot axis S or shaft 45 up to a free end. The arms 50, 51 extend in different directions and according to the example, originating from the pivot axis S or shaft 45 in directions opposite to one another. The arms 50, 51 thereby form a straight lever. The length of the first arm 50 from the pivot axis up to its free end is shorter than the length of the second arm 51 from the pivot axis up to its free end.

The first arm 50 is configured to abut against the cold forming rack 18 with its free end and particularly to apply the clamping force F in working direction Z on the cold forming rack 18 (FIG. 2). For this purpose the second arm 51 of clamping body 36 is supported on the base body 39 via at least one clamping element 52. By means of the at least one clamping element 52 a torque around the pivot axis S or shaft 45 is created on clamping body 36 so that first arm 50 presses with the clamping force F in working direction Z against cold forming rack 18. The at least one clamping element 52 is a spring-elastic element or includes a spring-elastic element as a component, such as at least one helical spring and/or at least one disc spring. The at least one clamping element 52 can be compressed so that the clamping body 36 can be rotated around the shaft 45 or the pivot axis S, if the position of the carrier 15 or the cold forming rack 18 in working direction Z is changed by means of the adjustment device 25. The magnitude of the clamping force F can thereby change depending on the compression of the at least one clamping element 52.

In the embodiment described here positionable stop surface 41 is arranged on the clamping body 36 and according to the example, on the free end of first arm 50. As explained, clamping body 36 can be positioned in longitudinal direction X relative to the base body 39, e.g. by means of threaded bolt 47. Alternatively, positionable stop surface 41 could also be provided on another component of the second clamping unit 38 that is positionable in longitudinal direction X relative to the base body 39.

Figure 5:
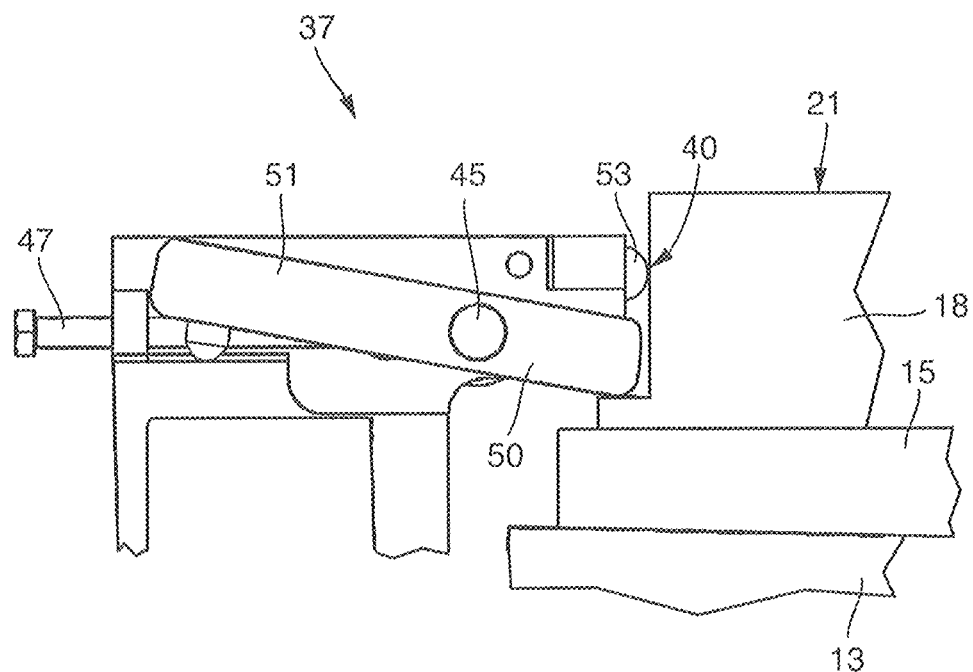

Based on FIGS. 3 and 5 it is apparent that the free end of first arm 50 of the clamping body 36 of the first clamping unit 37 is arranged with distance to the cold forming rack 18 in longitudinal direction X. The support of the cold forming rack 18 in longitudinal direction X is provided by means of the stationary stop surface 40 on base body 39 and not by means of the clamping body 36.

In an embodiment a friction bearing is formed between stationary stop surface 40 and cold forming rack 18 (FIGS. 2, 3 and 7). Alternatively to this, also at least one roller body 53 could be rotatably supported on the base body 39 on which the stationary stop surface 40 is present (FIG. 5). Thereby the relative movement of cold forming rack 18 relative to the stationary stop surface 40 can be simplified during positioning of the cold forming rack 18 in working direction Z.

Figure 6:
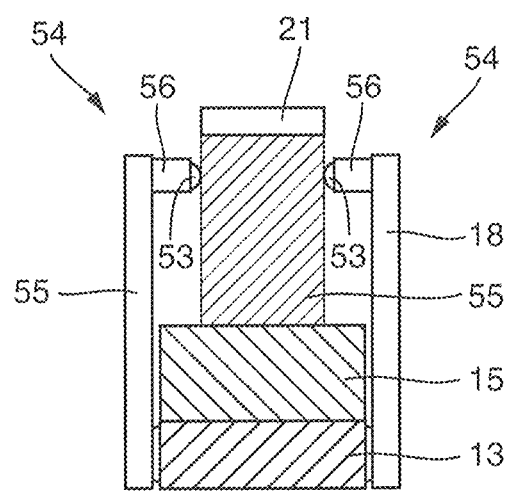

Based on FIGS. 6 and 7 an optional support of the cold forming rack 18 in transverse direction Y is illustrated. For this purpose, according to the example, at least one support unit 54 is provided on both sides of the cold forming rack 18 in transverse direction Y. Each support unit 54 is indirectly or directly attached to tool slide 12. In the embodiment each support unit 54 has a holding body 55 that is attached to support body 13. Originating from support body 13, holding body 55 extends in working direction Z up to an end on which it supports a support element 56 that abuts against cold forming rack 18. Between the support element 56 and the cold forming rack 18 a friction bearing or roller bearing can be provided. In the embodiment illustrated here each support element is formed by means of a roller bearing pin or ball bearing pin that carries a roller body 53 by means of which it abuts against the cold forming rack 18.

The number of support units 54 for supporting cold forming rack 18 can particularly vary depending on the length of the cold forming rack 18 in longitudinal direction X. In the embodiment two support units 54 are arranged on both sides of the cold forming rack 18 in each case. In transverse direction Y two support units 54 can be arranged opposite one another respectively.

The present disclosure refers to a tool unit 10 for a cold forming machine 11. The tool unit 10 has a tool slide 12, which is linearly movable in a longitudinal direction X. A carrier 15 for a cold forming rack 18 of the tool unit 10 is provided on the tool slide 12. By means of an adjustment device 25, the carrier 15 can be positioned in a working direction Z. For this purpose carrier 15 can be preferably linearly moved in working direction Z. In working direction Z the cold forming rack 18 is supported on the carrier 15 and is clamped by means of a clamping device 19 against the carrier. For this purpose the clamping device 19 has at least one clamping body 36, which can be moved opposed to a clamping force F in working direction Z and abuts against the cold forming rack 18. The clamping device is preferably not directly connected with the carrier 15. The clamping force F is particularly supported indirectly or directly on the tool slide 12 by passing carrier 15.

LIST OF REFERENCE SIGNS 10 tool unit
11 cold forming machine
12 tool slide
13 support body
14 support surface
15 carrier
16 base surface
17 contact surface
18 cold forming rack
19 clamping device
20 workpiece
21 cold forming profile
25 adjustment device
26 adjustment motor
27 spindle arrangement
28 motor shaft
29 spindle
30 spindle nut
31 coupling element
32 coupling
36 clamping body 37 first clamping unit
38 second clamping unit
39 base body
40 stationary stop surface
41 positionable stop surface
45 shaft
46 longitudinal recess
47 threaded bolt
50 first arm
51 second arm
52 clamping element
53 roller body
54 support unit
55 holding body
56 support element
α inclination angle
F clamping force
S pivot axis
X longitudinal direction
Y transverse direction
Z working direction

The invention claimed is:

1. A tool unit for a cold forming machine, comprising:
a tool slide movable in a longitudinal direction,
a carrier arranged on the tool slide,
a cold forming rack arranged on the carrier so that a cold forming profile of the cold forming rack is orientated in a working direction,
an adjustment device, arranged on the tool slide, wherein the adjustment device comprises an adjustment motor that is configured to move the carrier in working direction relative to the tool slide, and
a clamping device, arranged on the tool slide, the clamping device comprising a clamping body that is movably supported opposed to a clamping force in the working direction, whereby the clamping device is configured to urge the cold forming rack in the working direction against the carrier by the at least one clamping body, wherein the clamping device further comprises a first clamping unit and a second clamping unit that are arranged with distance to one another in the longitudinal direction, so that the cold forming rack can be arranged between the first clamping unit and the second clamping unit and the first clamping unit and the second clamping unit each comprise at least one clamping body and the at least one clamping body is supported in a positionable manner in the longitudinal direction on a base body of a respective one of the first clamping unit and the second clamping unit.

2. The tool unit according to claim 1, wherein the tool slide is immovably arranged in working direction.

3. The tool unit according to claim 1, wherein the clamping device is configured to support the cold forming rack in the longitudinal direction.

4. The tool unit according to claim 1, wherein the clamping device is configured to support the cold forming rack in the longitudinal direction and the first clamping unit and/or the second clamping unit comprises a stationary stop surface for the cold forming rack that is immovably arranged in the longitudinal direction relative to tool slide.

5. The tool unit according to claim 4, wherein the first clamping unit and/or the second clamping unit comprises a positionable stop surface for the cold forming rack, which can be positioned in the longitudinal direction relative to the tool slide.

6. The tool unit according to claim 5, wherein the positionable stop surface is arranged on the clamping body.

7. The tool unit according to claim 1, wherein the first clamping unit and the second clamping unit each comprise a base body that is arranged on the tool slide.

8. The tool unit according to claim 7, wherein the adjustment motor of the adjustment device is arranged on the base body of the first clamping unit or the second clamping unit.

9. The tool unit according to claim 1, wherein the at least one clamping body is pivotably supported around a pivot axis that extends obliquely or orthogonal to the working direction.

10. The tool unit according to claim 9, wherein the first clamping unit and the second clamping unit each comprise a base body that is arranged on the tool slide, the at least one clamping body being arranged in a torque-proof manner on a shaft extending along the pivot axis, wherein the shaft is supported in a positionable manner in the longitudinal direction on the base body of a respective one of the first clamping unit and the second clamping unit.

11. The tool unit according to claim 9, wherein the at least one clamping body comprises a first arm extending away from the pivot axis in one direction and a second arm extending away from the pivot axis in another direction.

12. The tool unit according to claim 11, wherein the first arm is configured to abut against the cold forming rack and wherein the second arm is supported on a respective one of the first clamping unit and the second clamping unit via at least one clamping element producing a clamping force.

13. The tool unit according to claim 2, wherein the clamping device is configured to support the cold forming rack in the longitudinal direction.

* * * * *